(12) United States Patent
Nemeth et al.

(10) Patent No.: US 12,370,990 B2
(45) Date of Patent: Jul. 29, 2025

(54) BRAKE SYSTEM FOR A MOTOR VEHICLE AND TRAILER AIR SUPPLY AND CONTROL MODULE

(71) Applicant: KNORR-BREMSE Systeme fuer Nutzfahrzeuge GmbH, Munich (DE)

(72) Inventors: Huba Nemeth, Budapest (HU); Peter Szell, Budapest (HU); Matthias Seidenschwang, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 492 days.

(21) Appl. No.: 17/777,821

(22) PCT Filed: Nov. 10, 2020

(86) PCT No.: PCT/EP2020/081601
§ 371 (c)(1),
(2) Date: May 18, 2022

(87) PCT Pub. No.: WO2021/099180
PCT Pub. Date: May 27, 2021

(65) Prior Publication Data
US 2023/0021986 A1 Jan. 26, 2023

(30) Foreign Application Priority Data
Nov. 18, 2019 (EP) .................................... 19209862

(51) Int. Cl.
*B60T 13/00* (2006.01)
*B60T 13/26* (2006.01)
*B60T 13/68* (2006.01)

(52) U.S. Cl.
CPC .......... *B60T 13/263* (2013.01); *B60T 13/683* (2013.01); *B60Y 2200/147* (2013.01); *B60Y 2400/81* (2013.01)

(58) Field of Classification Search
CPC ........ B60T 7/20; B60T 11/108; B60T 13/263; B60T 13/265; B60T 13/683;
(Continued)

(56) References Cited

U.S. PATENT DOCUMENTS 5,042,883 A * 8/1991 McCann ................. B60T 17/18
303/29
7,517,026 B1 * 4/2009 Herbst ...................... B60T 7/20
303/3

(Continued)

FOREIGN PATENT DOCUMENTS

| CA | 2 349 656 A1 | 12/2002 |
|---|---|---|
| CN | 103192812 A | 7/2013 |

(Continued)

OTHER PUBLICATIONS

International Search Report (PCT/ISA/210) issued in PCT Application No. PCT/EP2020/081601 dated Feb. 10, 2021 with English translation (three (3) pages).

(Continued)

*Primary Examiner* — Nicholas J Lane
(74) *Attorney, Agent, or Firm* — Crowell & Moring LLP

(57) ABSTRACT

A trailer air supply and control module for a electronic brake system of a motor vehicle with a trailer interface, and a brake system of a motor vehicle with a trailer interface comprising the trailer air supply and control module, includes at least two electrical terminals configured to receive two independent but redundant electrical control input signals which comprise a signal for a preset brake control outlet pressure. At least one valve is configured to adjust a constant air pressure from an air pressure source to the preset brake outlet pressure. One pneumatic outlet terminal is configured to provide the preset brake supply outlet pressure to the pneumatic brake system of the trailer, and one pneumatic outlet terminal is configured to provide the preset brake (Continued)

control outlet pressure to the pneumatic brake system of the trailer. The air pressure source is arranged within the trailer air supply and control module.

11 Claims, 1 Drawing Sheet

(58) Field of Classification Search
CPC .... B60T 15/181; B60T 15/182; B60T 15/203; B60T 15/206; B60T 15/223; B60T 15/226
See application file for complete search history.

(56) References Cited

U.S. PATENT DOCUMENTS

| | | | | |
|---|---|---|---|---|
| 11,565,681 | B2 * | 1/2023 | Dombek | B60T 17/043 |
| 2002/0124893 | A1 | 9/2002 | Frank et al. | |
| 2007/0170774 | A1 * | 7/2007 | Gerum | B60T 13/66 |
| | | | | 188/140 R |
| 2009/0309413 | A1 | 12/2009 | Bensch et al. | |
| 2010/0187902 | A1 | 7/2010 | Bensch et al. | |
| 2011/0144855 | A1 * | 6/2011 | Herges | B60T 8/327 |
| | | | | 701/29.1 |
| 2012/0001477 | A1 | 1/2012 | Mederer | |
| 2014/0183935 | A1 | 7/2014 | Harrison et al. | |
| 2015/0239441 | A1 | 8/2015 | Klostermann et al. | |
| 2016/0068144 | A1 * | 3/2016 | Hummel | B60T 8/1708 |
| | | | | 701/78 |
| 2017/0240125 | A1 | 8/2017 | Weigert et al. | |
| 2018/0001879 | A1 | 1/2018 | Witte | |
| 2018/0111596 | A1 * | 4/2018 | Kim | F02N 11/103 |
| 2018/0229705 | A1 * | 8/2018 | Farres | B60T 8/172 |
| 2018/0362008 | A1 * | 12/2018 | Farres | B60T 13/662 |
| 2019/0263371 | A1 * | 8/2019 | Goers | B60T 15/027 |
| 2020/0223414 | A1 * | 7/2020 | Brütt | B60T 13/263 |
| 2021/0237703 | A1 * | 8/2021 | Henderson | B60T 13/662 |
| 2022/0340111 | A1 * | 10/2022 | Fry | B60T 15/027 |
| 2023/0001904 | A1 * | 1/2023 | Nemeth | B60T 13/26 |

FOREIGN PATENT DOCUMENTS

| | | |
|---|---|---|
| CN | 103608225 A | 2/2014 |
| CN | 107097736 A | 8/2017 |
| CN | 107206995 A | 9/2017 |
| DE | 103 10 235 A1 | 9/2004 |
| DE | 10 2006 041 010 A1 | 3/2008 |
| DE | 10 2007 008 504 A1 | 8/2008 |
| DE | 10 2007 038 472 A1 | 2/2009 |
| EP | 1 127 764 A2 | 8/2001 |
| EP | 2 913 236 A2 | 9/2015 |
| EP | 3 536 570 A1 | 9/2019 |
| JP | 2005-247274 A | 9/2005 |
| JP | 2017-177954 A | 10/2017 |
| JP | 2018-100057 A | 6/2018 |
| WO | WO 2009/152982 A2 | 12/2009 |

OTHER PUBLICATIONS

Written Opinion (PCT/ISA/237) issued in PCT Application No. PCT/EP2020/081601 dated Feb. 10, 2021 (five (5) pages).
Extended European Search Report issued in European Application No. 19209862.2 dated Feb. 14, 2020 (five (5) pages).
Chinese-language Office Action issued in Chinese Application No. 202080080363.4 dated Mar. 10, 2023 with English translation (nine (9) pages).
Japanese-language Office Action issued in Japanese Application No. 2022-528647 dated Aug. 1, 2023 with English translation (7 pages).

* cited by examiner

BRAKE SYSTEM FOR A MOTOR VEHICLE AND TRAILER AIR SUPPLY AND CONTROL MODULE

BACKGROUND AND SUMMARY OF THE INVENTION

The invention relates to a brake system for a motor vehicle to be equipped with a trailer, comprising a trailer control module, and to a trailer control module for such a brake system.

Nowadays, brake systems of commercial vehicles are operated with compressed air, in both, motor vehicles and their trailers. In the brake system, the interface between motor vehicle and trailer is standardized with appropriate compressed air connections.

However, the electrification of brake systems in modern vehicles is an attractive way to reduce auxiliary energy consumption, space need and noise emissions. As trailers usually have a longer life cycle, and hence could have many different owners throughout their life cycles, a solution for the electrification of brake systems of motor vehicles should be compatible with existing brake systems of trailers, which usually still work with pneumatic brakes, in order to be able to continue using existing trailers with pneumatic brakes. Therefore, a solution is required, which is able to control the pneumatic brake system of a trailer from the electro-mechanic brake system of motor vehicles.

In state of the art brake systems for motor vehicles and trailers, for example described in document DE10310235A1, the brakes of the trailer are controlled by trailer control valves (TCV) or a so-called trailer control module (TCM), which is/are positioned in the motor vehicle and therefore forms/form part of its brake system. In order to be able to provide brake pressure even if one brake circuit signal does not work, a redundant independent signal is necessary. Hence, the TCVs/TCM comprise at least two independent control input terminals that are able to receive inputs from an electronic control unit (ECU) that processes the signals of a service brake, which is operated by the operator of the vehicle, if there is a need to slow the vehicle down. Those inputs from the ECU to the TCV/TCMs are either both pneumatic in case of the use of TCVs or one is pneumatic and one is electric from an electric control line in case of the use of a TCM. Moreover, TCV/TCMs comprise an inverted pneumatic control input coming from the parking brake, a compressed air supply inlet and two coupling head outputs, one for the air supply of the trailer and one for the pneumatic control line for the trailer brakes. Furthermore, there is optionally a digital communication line between the motor vehicle and the trailer in the form of a 24V CAN bus, standardized according to ISO 11992. The description of an internal design of a state-of-the-art TCM is provided for example in the document EP1127764. A TCM according to the state of the art disclosed in the document is provided with three different solenoid valves, with which in combination of a relay valve allows to adjust the brake pressure for the braking units of a trailer.

With modern electro-mechanic brake systems of motor vehicles being able to provide only electrical outputs instead of at least one pneumatic output, the need for new TCMs arises. Therefore, it is the objective of the present invention to provide a TCM and a non-pneumatic brake system on the motor vehicle with a TCM that are compatible with the pneumatic state-of-the-art trailer brake systems described above.

Such a TCM and a brake system for a motor vehicle with the TCM is provided by the subject-matters of the independent claims. Further developments of the invention with advantageous effects are provided by the dependent claims.

A trailer control module for a brake system of a motor vehicle according to the present invention comprises a preset brake control outlet pressure to a pneumatic trailer brake system and comprises at least two electrical terminals, which are configured to receive two independent but redundant electrical control input signals, which comprise the signal for the preset brake control outlet pressure. It further comprises at least one valve, configured to adjust a constant air pressure from an air pressure source to the preset brake outlet pressure and at least one pneumatic outlet, configured to provide the preset brake control outlet pressure to the pneumatic brake system of the trailer. According to the invention, the air pressure source is positioned within the trailer control module, i.e. Trailer Air supply and control Module (TASM).

In an advantageous embodiment of the invention, the TASM comprises at least one compressor, configured to serve as air pressure source.

In another advantageous development of the embodiment of the invention, the TASM further comprises an air processing unit, which is configured to stabilize the pressure level around a preset value with preset divergences and to control the humidity level of the air provided by the air source. In this way, the air pressure supply can be improved and a constant quality of the air can be assured.

In another advantageous development of the embodiment of the invention, the trailer control module comprises an air reservoir, configured to store air pressure generated by the air source. The use of an air reservoir allows storing air pressure for a certain period of time. In this way, the operation of the compressor can be controlled independently of the current air pressure requirements of the brake system. It also allows the use of a smaller compressor, which has a smaller energy consumption, as the compressor doesn't need to directly provide a certain air pressure level to the brake system but is able to refill the air reservoir in times when the brake system doesn't need any air pressure.

In yet another advantageous embodiment of the invention, the TASM optionally comprises a connection interface for an external air reservoir.

In an advantageous embodiment of the invention the TASM comprises at least two control solenoid groups, each including a load- and an exhaust valve and each group allowing to control the brake control outlet pressure by itself and independently from one another via its own control channel. Each solenoid group is provided with its own independent but redundant signal from the two different brake ECUs. Hence, in order for the TASM to be able to process both different but redundant electric signals independently from each other and satisfy the existing safety requirements, it also needs internally two separate pressure control channels in which the pneumatic signals can be processed to the brake control outlet pressure. An advantage of the use of solenoids in the TASM is that solenoids are well known in the state of the art, easy to handle also in terms of maintenance and don't need a lot of energy to be operated.

A further advantageous embodiment of the TASM according to the invention comprises a normally opened exhaust valve for normally not parked trailer control for each control channel.

In a further advantageous embodiment of the invention, the TASM comprises a normally closed exhaust valve and a feedback orifice for normally parked trailer control for each control channel to provide a bistable parking brake behavior.

In another advantageous embodiment of the invention the TASM comprises a normally closed exhaust valve and a feedback orifice for normally parked trailer control for one control channel and a normally opened exhaust valve for normally not parked trailer control for another control channel.

In yet another advantageous embodiment of the invention the TASM comprises at least two independent pressure sensors, configured to measure the brake control outlet pressure of the trailer. In this way the correct functionality of the brake system and the TASM can easily be controlled and adjusted by the ECUs of the motor vehicle brake system if necessary.

In a further advantageous embodiment of the invention, the trailer air supply and control module comprises a hold back valve to trigger the automatic trailer emergency braking at unexpected trailer disconnection.

A motor vehicle brake system according to the invention comprises, at least two independent brake control units (ECUs) which are configured to provide the TASM with at least two independent but redundant electronic signals which comprise the signal for the preset brake control outlet pressure.

In an advantageous embodiment of the motor vehicle brake system according to the invention, it further comprises a communication line between the trailer and the brake control units, wherein a multiplexer is configured to connect the trailer to either one or the other brake control unit, so that only one brake control unit is connected with the trailer at the time.

Other objects, advantages and novel features of the present invention will become apparent from the following detailed description of one or more preferred embodiments when considered in conjunction with the accompanying drawings.

DETAILED DESCRIPTION

Figure 1:
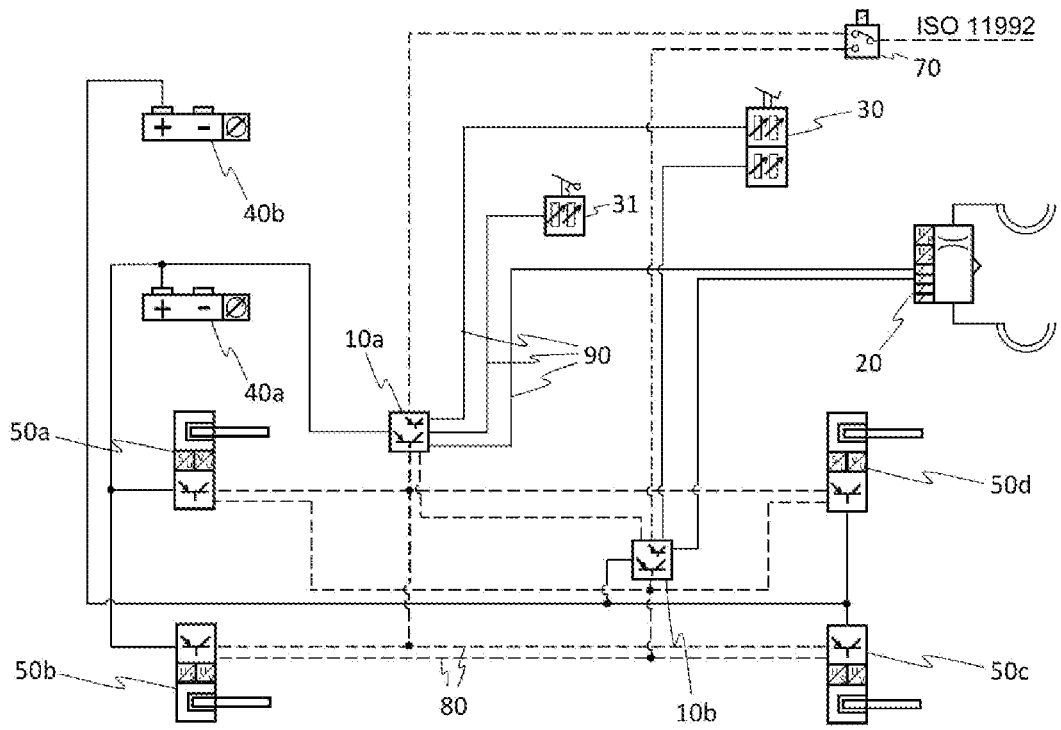
FIG. 1 a schematic layout of the motor vehicle brake system according to an embodiment of the invention.

FIG. 1 shows a schematic layout of the motor vehicle brake system according to an embodiment of the invention. The brake system is powered by at least two independent electric energy sources 40a, 40b and controlled by at least two independent electronic control units 10a, 10b (ECU). The foot brake sensor 30 is operated by the operator of the motor vehicle in case that braking is necessary. The signal is provided at both, the first ECU 10a and the second ECU 10b. Further, a parking brake control 31 is also connected with both ECUs 10a, 10b. Both, the parking brake control 31 and the foot brake sensor 30 are connected with the ECUs 10a, 10b via analog or digital electrical lines 90. The first ECU 10a is further connected with the second ECU 10b via a digital electric signal line 80. Both ECUs 10a, 10b are capable of controlling at least four wheel brake units 50a, 50b, 50c, 50d via a digital electrical line 80, so that both ECUs 10a, 10b are capable of commanding the wheel brake units 50a-50d through at least two independent communication lines.

The wheel brake units 50a, 50b as well as the first ECU 10a are powered by the first electric energy source 40a, while the wheel brake units 50c, 50d and the second ECU 10b are powered by the second electric energy source 40b.

In order to achieve braking performance of the trailer, both ECUs 10a, 10b send redundant electric signals via analog or digital electric lines 90 to a trailer air supply and control module (TASM) 20, which provides a braking outlet pressure to the trailer brake system. The TASM 20 is only provided with electric signals to adjust the brake pressure for the trailer.

A multiplexer 70 is connected with the trailer via a standardized CAN-bus according to ISO 11992 known from the state of the art and either passes the signals from the first ECU 10a or of the second ECU 10b to the trailer. It can be either physical (by an active switch) or functional (by e.g. an interconnected bus to both brake control units and a master is commanding and a slave is listening).

In operation, the operator (driver) of the motor vehicle operates the foot brake sensor (30) for normal service brake needs and the parking brake control 31, if a movement of the vehicle in standstill is to be prevented. The electric signal is passed to both ECUs 10a, 10b, where a necessary braking force is calculated, according to which the ECUs 10a, 10b control the wheel brake units 50a, 50b, 50c, 50d of the motor vehicle via the corresponding digital electric signal lines 80. Further, the information of a brake pressure, which needs to be applied to the pneumatic brake system of the trailer is passed via electric signals to the TASM 20 via the analog or digital electric line 90. With the given signals by the ECUs 10a, 10b, the TASM adjusts the demanded brake pressure and provides it to the brake system of the trailer. Further, information of either one of the ECUs 10a, 10b is provided to the trailer according to the position of the multiplexer 70 via the CAN-bus.

Figure 2:
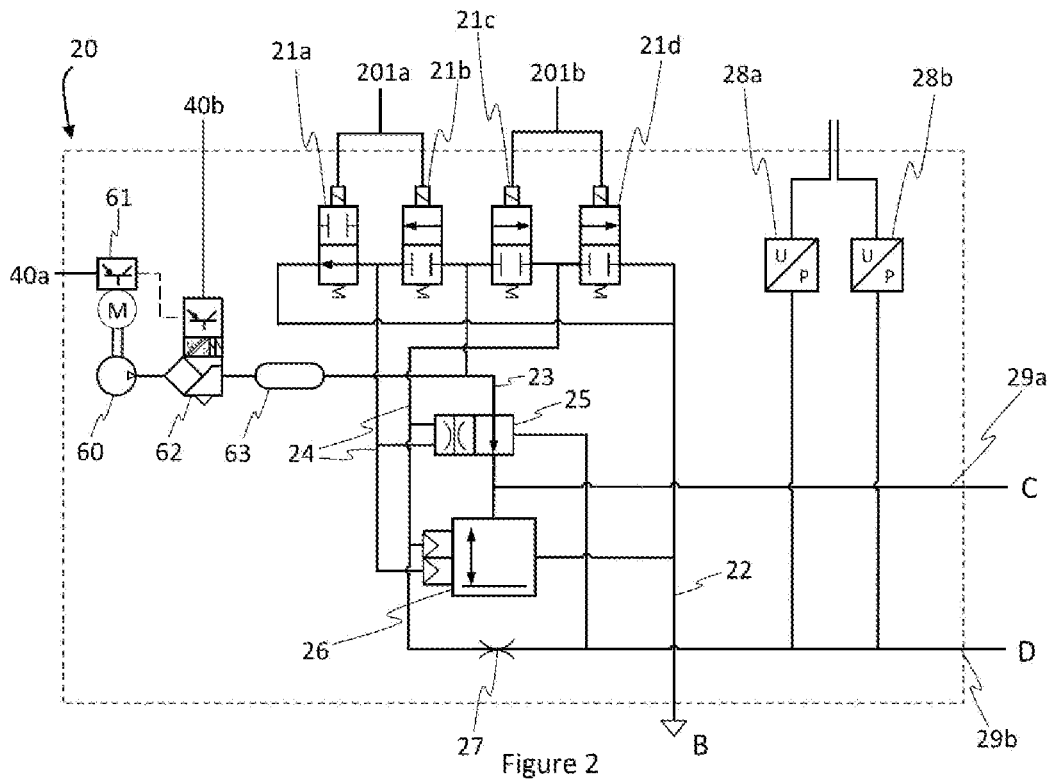
FIG. 2 a schematic layout of the architecture of a TASM according to an embodiment of the invention.

FIG. 2 shows a schematic layout of the architecture of a TASM according to an embodiment of the invention. The TASM is provided with a compressor 60 as air pressure source, to generate compressed air. It is driven by an e-motor-inverter unit 61, which is powered by the first power supply unit 40a. The generated compressed air is provided via a pressure connection at an air processing unit 62, which controls its pressure level and the humidity level. The air processing unit 62 is energized by the second power supply 40b, but could also be energized by the first power supply 40a in another embodiment. It receives electric signals from the e-motor-inverter unit 61 and is able to control the pressure level by an included pressure sensor.

The compressed air coming from the air processing unit 62 is subsequently stored in an air reservoir 63 before it is provided at a hold back valve 25 and two solenoid valves 21b and 21c. Both of them are in the following also referred to as load valves 21b, 21c and are in a normally closed state. At each side of the load valves 21b, 21c, two further solenoid valves 21a, 21d are positioned, which are also referred to as exhaust valves 21a, 21d, the exhaust valve 21a being in a normally opened state and the exhaust valve 21d being in a normally closed state. All of the four solenoid valves 21a-21d are controlled by the electric signals of the two ECUs 10a, 10b of the brake system of the motor vehicle. The solenoid valves 21a, 21b form one group controlled by the first ECU 10a and the solenoid valves 21c, 21d form a second group controlled by the second ECU 10b.

From both of the load valves 21b, 21c, a control pressure line 24 to the hold back valve 25 and to the corresponding exhaust valve 21a, 21d of each group is formed. Further the control pressure lines 24 from the load valves 21b, 21c also connect a dual channel relay valve 26 and a throttle 27. Thus the hold back valve 25 and the dual channel relay valve 26 can be controlled via the pressure provided at the outlets of the load valves 21b, 21c. A further pressure line, referred to as exhaust pressure line 22, leads from the outlets of the exhaust valves 21a, 21d and the dual channel relay valve 26 to an exhaust outlet terminal B, where pressure, which is not needed anymore in the system, can be released to the atmosphere.

Moreover, one outlet of the hold back valve 25 is connected to one inlet of the dual channel relay valve 26 via a first outlet brake pressure line 29a, which also leads to a first outlet pressure terminal C providing compressed air supply to the trailer. As mentioned above, one outlet of the dual channel relay valve 26 is connected to the exhaust outlet terminal B. Another outlet of the dual channel relay valve 26 is connected to a second outlet brake pressure terminal D by a second outlet brake pressure line 29b providing brake control pressure to the trailer. The pressure in the second outlet brake pressure line 29b is measured by two pressure sensors 28a, 28b, which are permanently connected via with both ECUs 10a, 10b.

In the embodiment of the invention shown in FIG. 2, the pressure generated by the compressor 60, is provided by the air processing unit 62, where the compressed air is dehumidified. Coming from there, it is stored in an air reservoir 63, which can be internal or external to the TASM. By using an air reservoir, the compressor can be designed smaller without risking of not being able to provide a required air pressure level, which might be needed at any time during operation of the brake system. The compressed air can be stored in the air reservoir 63 and thus the compressor does not necessarily need to be able to provide a constant high pressure for the brake system. In case there is no compressed air needed by the brake system, the compressor can easily refill the air reservoir and be switched off in case the air reservoir 63 is full. This helps to save energy and thus has positive effect on energy consumptions and costs.

From the air reservoir 63, compressed air with a constant pressure can directly be provided at the first outlet brake pressure terminal C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST 10a first electronic control unit
10b second electronic control unit
20 Trailer air supply and control module (TASM)
201a, 201b electrical terminal
21a, 21d solenoid valve: exhaust valve
21b, 21c solenoid valve: load valve
22 exhaust pressure line
23 air pressure source line
24 control pressure channel
25 hold back valve
26 dual channel relay valve
27 orifice
28a, 28b pressure sensors
29a outlet brake supply pressure line
29b outlet brake control pressure line
30 foot brake sensor
31 parking brake control
40a first electric energy source
40b second electric energy source
50a, 50b, 50c, 50d wheel brake unit
60 air compressor
61 e-motor-inverter unit
62 air processing unit
63 air reservoir
70 multiplexer
80 digital electric signal line
90 analog or digital electric line
B exhaust outlet terminal
C first outlet, brake supply pressure terminal
D second outlet, brake control pressure terminal

The invention claimed is:

1. A trailer air supply and control module for a brake system of a motor vehicle with a trailer having a pneumatic brake system, the trailer air supply and control module comprising:
at least two electrical terminals configured to receive two independent but redundant electrical control input signals corresponding to a signal for a preset brake control outlet pressure;
at least one valve configured to adjust a constant air pressure from an air pressure source to the preset brake outlet pressure;
a first pneumatic outlet terminal configured to provide a brake supply outlet pressure to the pneumatic brake system of the trailer;
a second pneumatic outlet terminal configured to provide the preset brake control outlet pressure to the pneumatic brake system of the trailer, wherein the air pressure source is arranged within the trailer control module; and
at least two control solenoid groups, each the at least two solenoid groups forming part of a control channel including at least one load valve and at least one exhaust valve.

2. The trailer air supply and control module according to claim 1, wherein
the air pressure source includes at least one compressor.

3. The trailer air supply and control module according to claim 2, wherein
the air pressure source includes an air processing unit configured to regulate a pressure and a humidity level of the air provided by the air source.

4. The trailer air supply and control module according to claim 3, wherein the trailer air supply and control module includes an air reservoir configured to store air pressure generated by the air source.

5. The trailer air supply and control module according to claim 3, wherein
the trailer air supply and control module includes a pneumatic interface configured to be in fluid communication with an external air reservoir.

6. The trailer air supply and control module according to claim 1, wherein
the at least one exhaust valve of a first one of the at least two solenoid control groups is a normally opened exhaust valve configured to provide normally not parked trailer control for each control channel.

7. The trailer air supply and control module according to claim 1, wherein
the at least one exhaust valve of a second one of the at least two solenoid groups is a normally closed exhaust valve, and the normally closed exhaust valve and a feedback orifice are configured to provide for normally parked trailer control for each control channel.

8. The trailer air supply and control module according to claim 1, wherein
the at least one exhaust valve of a second one of the at least two solenoid groups is a normally closed exhaust valve,
the normally closed exhaust valve and a feedback orifice are configured to provide for normally parked trailer control for a first control channel, and
the at least one exhaust valve of a first one of the at least two solenoid control groups is a normally opened exhaust valve configured to provide normally not parked trailer control for a second control channel.

9. The trailer air supply and control module according to claim 1, further comprising:
at least two independent pressure sensors configured to measure the brake control outlet pressure of the trailer.

10. The trailer air supply and control module according to claim 1, further comprising:
a hold back valve configured to trigger automatic trailer emergency braking when a trailer brake pressure supply line is disconnected when a trailer is connected to a motor vehicle.

11. A motor vehicle brake system, comprising:
at least two independent brake control units, each configured to control at least one wheel brake unit; and
a trailer air supply and control module having
at least two electrical terminals configured to receive two independent but redundant electrical control input signals corresponding to a signal for a preset brake control outlet pressure;
at least one valve configured to adjust a constant air pressure from an air pressure source to the preset brake outlet pressure;
a first pneumatic outlet terminal configured to provide a brake supply outlet pressure to the pneumatic brake system of the trailer;
a second pneumatic outlet terminal configured to provide the preset brake control outlet pressure to the pneumatic brake system of the trailer,
wherein
the air pressure source is arranged within the trailer control module, and,
each brake control unit is configured to provide an independent but redundant electric control signal to the trailer air supply and control module;
a communication line between a trailer and the brake control units, and
a multiplexer configured to permit only one of the at least two brake control units to be connected with the trailer at a time.

* * * * *